United States Patent
Steerman et al.

(10) Patent No.: US 6,948,513 B2
(45) Date of Patent: Sep. 27, 2005

(54) INTEGRAL CHECK VALVE FOR NOZZLES

(75) Inventors: Daniel E. Steerman, Harpers Ferry, WV (US); Melvyn J. L. Clough, Columbia, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 0 days.

(21) Appl. No.: 10/461,266

(22) Filed: Jun. 16, 2003

(65) Prior Publication Data

US 2004/0250858 A1 Dec. 16, 2004

(51) Int. Cl.$^7$ .............................. F16K 15/02; B60S 1/52
(52) U.S. Cl. ............................ 137/15.18; 137/315.33; 137/540; 239/284.1; 239/571
(58) Field of Search .................. 137/543.21, 15.18, 137/315.27, 315.33, 538, 540, 543.17; 239/284.1, 570

(56) References Cited

U.S. PATENT DOCUMENTS

| | | | | |
|---|---|---|---|---|
| 3,025,874 A | * | 3/1962 | Yocum | 137/540 |
| 3,027,913 A | * | 4/1962 | Chatham et al. | 137/484.2 |
| 3,245,429 A | * | 4/1966 | Bacino et al. | 137/543.21 |
| 3,580,275 A | * | 5/1971 | Hanson et al. | 137/516.29 |
| 4,350,179 A | * | 9/1982 | Bunn et al. | 137/540 |
| 4,590,962 A | | 5/1986 | Tespa | |
| 4,766,930 A | * | 8/1988 | Patti | 137/540 |
| 5,183,075 A | | 2/1993 | Stein | |
| 5,329,949 A | * | 7/1994 | Moncourtois et al. | 134/57 R |
| 5,636,794 A | | 6/1997 | Hess et al. | |

* cited by examiner

Primary Examiner—Ramesh Krishnamurthy
(74) Attorney, Agent, or Firm—Larry J. Guffey

(57) ABSTRACT

A check valve for use in a section of a liquid flow line to control the intermittent flow of a liquid through the line, wherein the section of the line that is configured to received the valve has inlet and outlet ends with an opening through which liquid respectively enters or exits the section, includes a compression spring having upstream and downstream ends, wherein the spring is configured so as to allow the downstream end to press against the section outlet end. This check valve further includes a piston having bottom, top and outer side surfaces, with this piston having a cavity that extends from its top surface and is configured to allow the spring to sit and operated freely within the cavity with the spring's upstream end resting on the bottom surface of the cavity. This piston also has an opening in its side surface that connects the cavity and its outer side surface, and the piston's bottom surface has a raised sealing surface with an outer boundary that is configured so as to allow the boundary to enclose the opening in the section's inlet end. This check valve operates by having its piston's bottom surface press against the section inlet end due to the action of the spring so as to seal around the opening of the inlet end. The piston is made from an elastomeric material so as to give the piston the elastic properties necessary to allow its bottom surface to act as a seal for the inlet opening.

6 Claims, 5 Drawing Sheets

PRIOR ART (USPN 5,636,794)

PRIOR ART (USPN 5,636,794)

PRIOR ART (USPN 5,636,794)

PRIOR ART (USPN 5,636,794)

INTEGRAL CHECK VALVE FOR NOZZLES

BACKGROUND OF THE INVENTION

1. Field of the Invention

This invention relates to fluid handling apparatus. More particularly, this invention relates to an integral check valve of the type that are used in windshield/glass washer nozzles.

2. Description of the Related Art

Windshield washer spray systems are well known in the art. Generally, they consist of windshield washer nozzles that are mounted in the hood of a vehicle. Fluidic inserts in these nozzles cause a jet of windshield washer fluid to be oscillated laterally so as to project a fan spray of windshield washer droplets that impinge over the whole lateral width of a windshield.

Check valves are typically included in the washer fluid feed lines of these nozzles to eliminate "drool" due to: (a) dynamic loads on the windshield washer system when the car is moving, and (b) static loads on the hood-mounted system when the car is stationary, but its hood is lifted.

These check valve are designed so as to have a threshold or cracking pressure below which no fluid will flow through the nozzle. Moreover, such check valves prevent air from entering the system through the nozzle, which thereby prevents fluid from draining back into the reservoir for the washer fluid. This permits a faster response time since the response time is not slowed due to the nozzle's feed tubes draining back into the reservoir after the system has been actuated. With the feed tubes remaining "primed," the response time of these nozzles is very fast. Finally, the relatively high cracking pressure of these nozzles provides a "crisp start-up and shut-off" which means that the number of drops from such nozzles that land on surfaces other than the glass at which they are directed is very small.

For such windshield washer applications, a washer nozzle typically includes a housing which is welded to an elbow or hose nipple after assembling the check valve components inside the elbow. The initial designs for washer nozzles were based on "ball and spring," or soft seat systems.

An example of such a Bowles Fluidics Corporation system that was commercially used for many years is given in FIG. 1 from U.S. Pat. No. 5,636,794 to Hess and Marsden. It is seen to comprise a molded housing 10 having a fluidic oscillator insert chamber 11 adapted to receive a molded silhouette member 12 which has a fluidic oscillator silhouette molded in face 13 and peripheral side and edge surfaces which are adapted to make a sealing engagement with the interior walls 14 of chamber 11. The fluidic oscillator has a power nozzle PN which is adapted to be aligned with the wash fluid inlet passage 15. Wash fluid inlet passage 15 is coupled to a second wash fluid inlet passage 16. In the embodiment shown, the oscillator chamber 11, inlet passage 15 and inlet passage 16 are made in the molding process by pins which are withdrawn to leave the passages. A ball 17 is forcibly inserted into the enlarged end 18 of wash fluid passage 15 to seal it.

The portions 19, 20 are designed to accommodate a particular opening in the hood or other mounting structure of a vehicle for mounting purposes and is not particularly relevant to the present invention.

As shown in FIG. 1, the second wash fluid passage 16 is formed in a nipple 21 which has an annular rib 22 molded therein. A check valve assembly 23 is included in a hose nipple 24. The check valve assembly 23 includes an annular shoulder 25 formed on an inward portion of inlet nipple 21 and includes a spring 26 urging ball valve element 27 into a valve seat 28 formed on the interior wall of wash fluid inlet passage 29. Check valve assembly 23 is assembled by placing the spring on the shoulder 25 and fitting the ball 28 into the seat and then forcing the annular connection collar 30 onto the nipple 21 with annular rib 22 seated in annular groove 31.

It will be appreciated that the design of FIG. 1 is, in effect, a two-piece nozzle housing where the two pieces are welded or glued together along the nipple 21 and the connection collar 30. That is, the line "L" where the two parts are joined together can leak and this also requires an extra assembly process.

The "ball and spring" check valves were found to suffer from several problems. These included: (a) poor sealing between the hard metal surface and hard plastic surfaces, (b) material corrosion in the contact area, which may lead to a stuck check valve, (c) cocking of the spring assembly in the housing which causes operational problems with the valves, (d) cumbersome manual assembly, (e) poor weld strength in joint linking the housing and the elbow due to the thin wall thicknesses and structural discontinuities in this area, and (f) difficulty in molding the complex plastic parts which comprise the housing and elbow.

This "ball and spring" check valve was improved upon by the introduction of the check valve shown in FIGS. 2–3(a)–(b) which are also from U.S. Pat. No. 5,636,794. In this check valve, the wash fluid feed tube 50 has an internal shoulder 51 which is deep within wash fluid input tube 50 for receiving the base of check valve spring 26'. A ball check valve 28' is urged or biased by spring 26' into engagement with valve seat 53 formed on the downstream end of tubular insert member 54 which has an external surface 55 having a diameter D at least sufficient to form an elongated wash fluid seal 56 with the annular walls 57 defining the wash fluid flow path. The tubular insert 54 can be adjusted in length LI (or its depth of insertion adjusted) to thereby adjust the cracking pressure e.g., the pressure when the valve unseats and wash fluid is allowed to flow to the windshield washer nozzle. Thus, by adjusting the length LI of tubular insert 54, the cracking pressure can be adjusted without any other structural change in the assembly.

For this check valve, the hose or rubber tube 60 is telescoped over the outer end of input tube 54 and is retained in place by barb 61. The rubber hose 60 seals along the external surface and is the only seal that is required thereby eliminating seals such as the seal between the coupling element 30 and nipple 21 of the prior art design shown in FIG. 1.

FIGS. 3(a)–(b) disclose other embodiments in which the shape of the check valve element is other then that of a ball. In FIG. 3(a), the check valve 66 has a conical external surface and a centering projection 65 on its downstream end. In FIG. 3(b), the check valve 75 has a rounded, mushroom-shape external surface and a centering projection 65 on its downstream end.

A further improvement to these types of check valves at Bowles Fluidics has been the replacement of these ball and other types of check valves with a "carrier assembly," consisting of a piston and seal, such as that shown in FIG. 4(a). More details of these piston and seal elements are shown in FIGS. 4(b)–(c). However, this configuration has been found to be cumbersome to manually assembly, and is not a manufacturing friendly design. Additionally, welding and molding of these parts has continued to be a problem.

Thus, despite the prior art, there still exists a continuing need for improvements in the design of check valves for a wide range of nozzle applications.

3. Objects and Advantages

Recognizing the need for the development of improved check valves, the present invention is generally directed to satisfying the needs set forth above and overcoming the disadvantages identified with prior art devices.

It is an object of the present invention to provide an improved check valve for a windshield washer system that is easier to manufacture than those previously and currently used.

It is another object of the present invention to provide an improved check valve for a windshield washer system that requires less manual labor to assemble.

It is yet another object of the present invention to provide an improved check valve for a windshield washer system that is easier to mold and weld than those previously and currently used.

Other objects and advantages of the present invention will become readily apparent as the invention is better understood by reference to the accompanying drawings and the detailed description that follows.

SUMMARY OF THE INVENTION

The present invention is generally directed to satisfying the need set forth above and the problems identified with prior check valves for windshield washer systems.

A more generalized form of a preferred embodiment of the present invention takes the form of a check valve for use in a section of a liquid flow line to control the intermittent flow of a liquid through the line, wherein the section of the line that is configured to received the valve has inlet and outlet ends with an opening through which liquid respectively enters and exits the section. The check valve includes a compression spring having upstream and downstream ends, wherein the spring is configured so as to allow the downstream end to press against the section outlet end. This check valve further includes a piston having bottom, top and outer side surfaces, with this piston having a cavity that extends from its top surface and is configured to allow the spring to sit and operated freely within the cavity with the spring's upstream end resting on the bottom surface of the cavity. This piston also has an opening in its side surface that connects the cavity and its outer side surface, and the piston's bottom surface has a raised sealing surface with an outer boundary that is configured so as to allow the boundary to enclose the opening in the section's inlet end. This check valve operates by having its piston's bottom surface press against the section inlet end due to the action of the spring so as to seal around the opening of the inlet end. The piston is made from an elastomeric material so as to give the piston the elastic properties necessary to allow its bottom surface to act as a seal for the inlet opening.

Thus, there has been summarized above, rather broadly, the present invention in order that the detailed description that follows may be better understood and appreciated. There are, of course, additional features of the invention that will be described hereinafter and which will form the subject matter of any eventual claims to this invention.

DESCRIPTION OF THE PREFERRED EMBODIMENT

Figure 1:
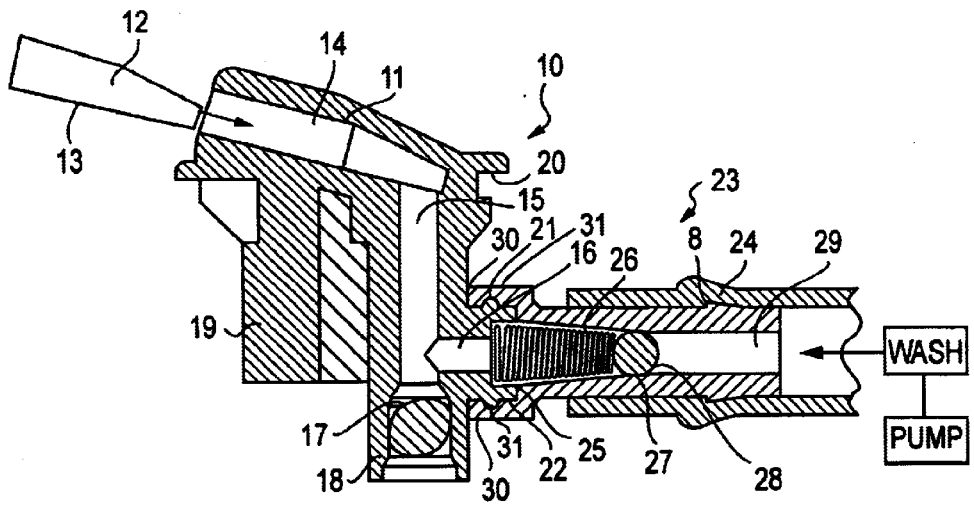
FIG. 1 is a sectional view of a fluidic nozzle incorporating a prior art "ball and spring" check valve.
Figure 2:
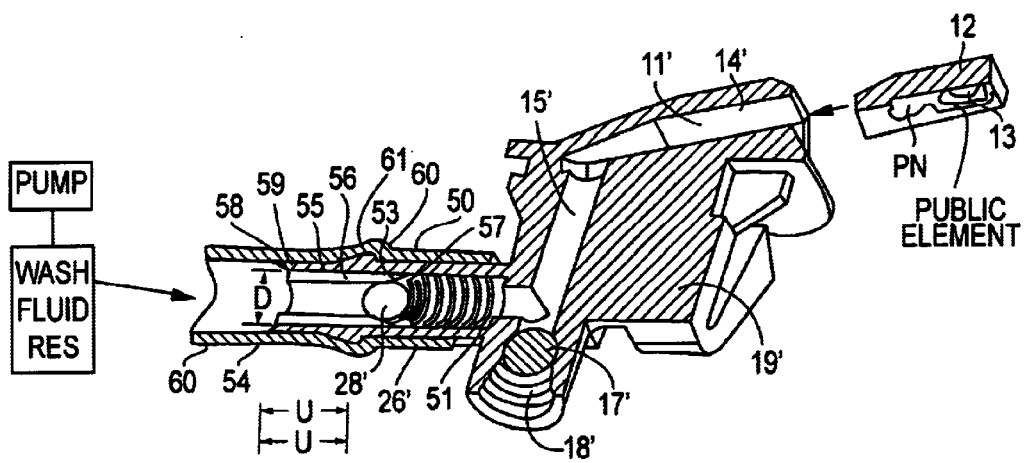
FIG. 2 is a sectional view of a fluidic nozzle incorporating a prior art check valve which has reduced the number of coupling surfaces that have to be sealed.
Figure 3A:
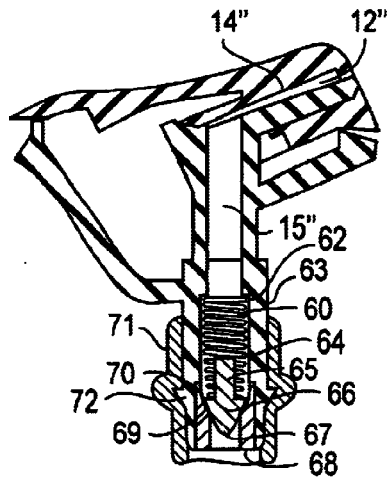
FIGS. 3(a)–(b) are sectional view of a fluidic nozzle incorporating a prior art check valve which also has a reduced the number of coupling surfaces to be sealed and shapes for the check valve that are other than the standard, ball-shaped design.
Figure 3B:
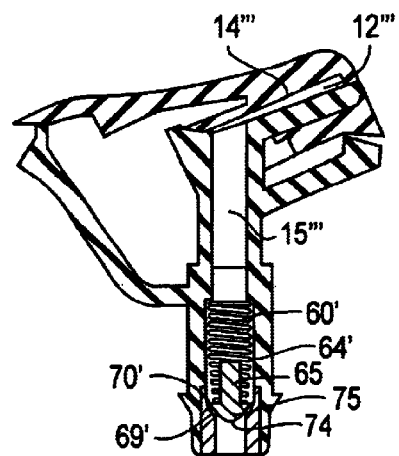

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 5A:
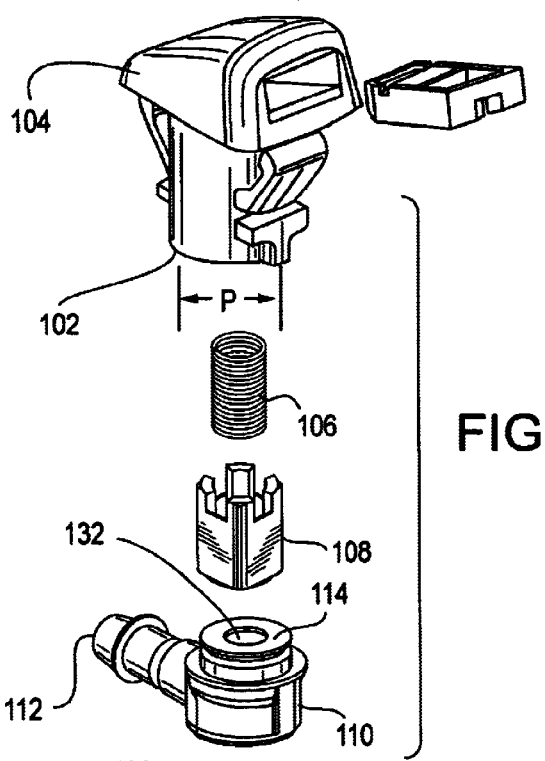
FIG. 5(a) is an exploded view of a fluidic nozzle incorporating a preferred embodiment of the check valve of the present invention.
Figure 5B:
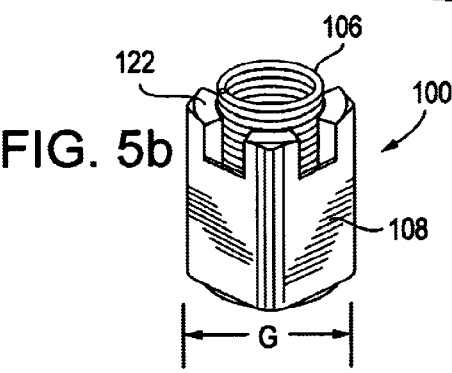
FIGS. 5(b)–(c) are perspective and assembly views of the spring and piston components of the check valve of the present invention.
Figure 5C:
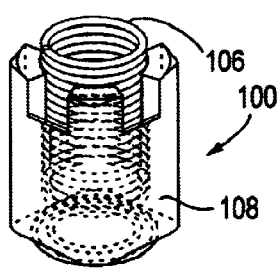
Figure 5D:
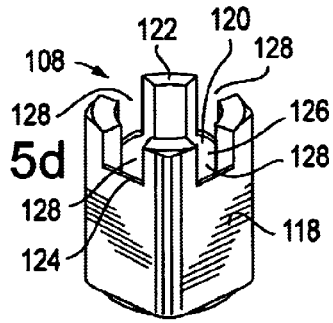
FIGS. 5(d)–(e) are top and bottom perspective views of the piston used in the embodiment shown in FIGS. 5(a)–(c) of the present invention
Figure 5E:
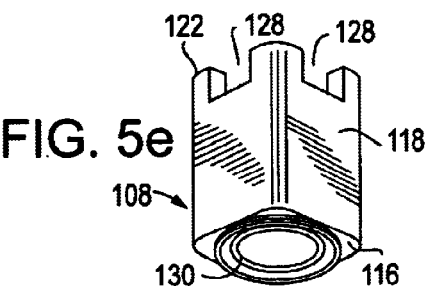

A preferred embodiment of the check valve 100 of the present invention is shown in FIGS. 5(a)–(e). FIG. 5(a) shows an exploded view of a windshield washer nozzle assembly and how, as before, the check valve is fitted into the opening 102 for the fluid flow inlet passage in the bottom of the nozzle housing 104 or first body member. The check valve 100 itself consists of a spring 106 and an especially configured and constructed piston 108. An elbow 110 or second body member mates with the bottom of the nozzle housing to form the assembly's flow channel, i.e., fluid flows into the elbow's inlet 112, through the elbow, out of the elbow's top surface 114, and if the fluid is sufficiently pressurized to overcome the resisting force of the spring, around the bottom 116 and the outer sides 118 of the piston and into the openings 128 at the top of the piston and on into the opening 102 for the fluid flow inlet passage in the bottom of the nozzle housing 104.

Figure 4A:
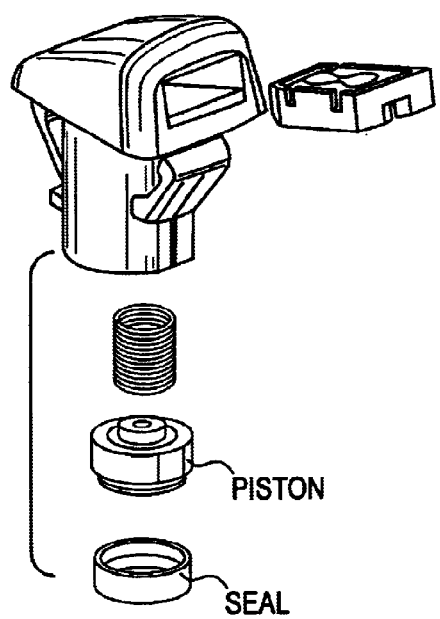
FIG. 4(a) is an exploded view of a fluidic nozzle incorporating a prior art check valve having a "carrier assembly" in place of the prior art "ball and spring" elements.
Figure 4B:
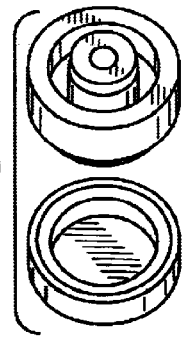
FIGS. 4(b)–(c) present top and bottom perspective views of the piston and seal elements that comprise the "carrier assembly" shown in FIG. 4(a).
Figure 4C:
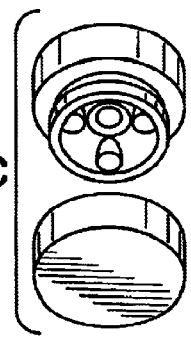

In this embodiment, the "carrier assembly" of FIG. 4(*b*)–(*c*), consisting of a piston and seal, has been replaced with a single, especially configured and constructed, elastomeric piston 108. The piston itself has a cavity 120 that extends from its top surface 122 and is configured to allow the spring 106 to sit on the bottom 124 of the cavity, with the interior walls 126 of this cavity being sufficiently spaced so that the spring 106 may be compressed down and not have the outer surface of the spring bind on the cavity's interior walls. Near the top of the sides 118 of the piston, there exist openings 128 which allow the fluid passing on the outside of the piston to move towards the centerline of the assembly and continue its flow into the opening 102 for the housing's inlet passage.

The bottom surface 116 of the piston in the embodiment shown in FIG. 5(*e*) has an especially configured raised, sealing surface 130 or O-ring whose diameter is chosen to be larger than and compatible with the opening 132 in the elbow's top surface 114 so that this sealing surface 130 is sufficient to seal the opening when the compressed spring 104 is forcing the sealing surface 130 against the elbow's top surface 114. The fact that the entire piston is constructed of an elastomeric material makes it possible to easily shape this surface 130 into the bottom of the piston and have it be a good sealing surface.

The size and shape of cross-section of the piston 108 shown in FIG. 5 is such as to allow the piston to fit within the nozzle's fluid flow passage. For the embodiment shown in FIG. 5, the cross-sectional shape of the piston is generally square, with the length of its diagonal, G, being slightly less than the diameter P of the fluid passage in which it is to be seated. See FIGS. 5(*a*)–(*b*).

Figure 6A:
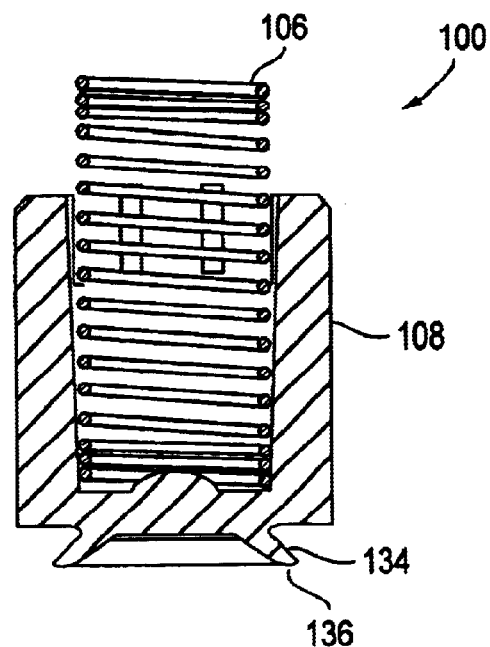
FIG. 6(a) is a cross-sectional view of another preferred embodiment of the present invention.
Figure 6B:
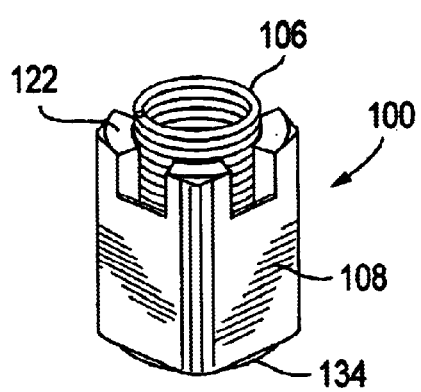
FIG. 6(b) is a perspective view of the embodiment shown in FIG. 6(a).
Figure 6C:
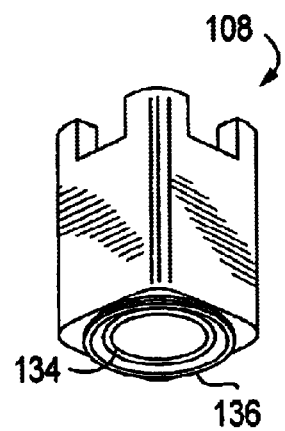
FIG. 6(c) is a bottom, perspective view of the piston used in the embodiment shown in FIGS. 6(a)–(b).

Shown in FIG. 6(*a*) is a side view of another embodiment of the present invention in which the piston's bottom surface has a sealing surface in the form of a concentric, sealing rib 134 rather than an O-ring. The tip 136 of this rib is seen to spread outward from its center so as to make more sealing surface area available for use in sealing flow from the opening in the elbow's top surface. FIG. 6(*b*) shows a perspective view of the check valve 100 shown in FIG. 6(*a*), and FIG. 6(*c*) shows a perspective view in which the bottom surface of the piston shown in FIGS. 6(*a*)–(*b*) can be seen.

For the embodiments shown in FIGS. 5 and 6, the task of inserting the spring 106 into this piston 108 is relatively simple. One of the advantages of this arrangement, as compared with the arrangement shown in FIG. 4(*a*), is that the spring is no longer balanced with no means of support on the piston during assembly of the nozzle. Due to the favorable length to diameter ratio of this piston 108, the spring 106 is retained within the piston 108 with no cocking during assembly and welding.

Figure 7A:
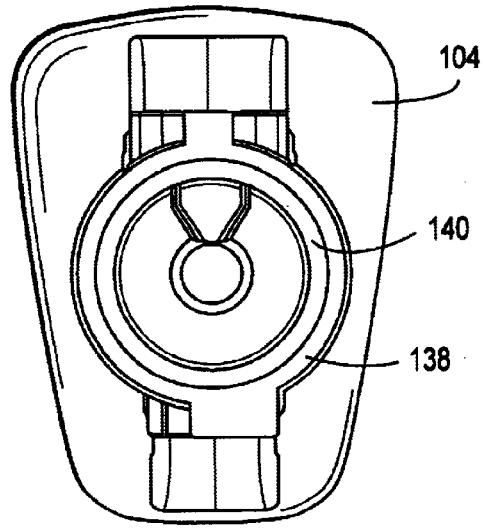
FIG. 7(a) is a cross-sectional view of the bottom surface of the nozzle housing shown in FIG. 5.
Figure 7B:
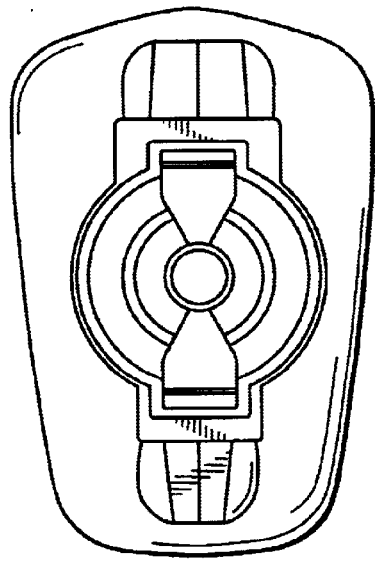
FIG. 7(b) is a cross-sectional view of the bottom surface of the nozzle housing shown in FIG. 4, and in which the wall thicknesses of the present invention can be compared with those attainable using the prior art technology shown in FIG. 4.

Shown in FIG. 7(*a*) is a bottom view of the nozzle housing 104 of the present invention which shows the bottom surface 138 surrounding the opening 102 for the nozzle's fluid flow inlet passage. To make it easier to join the elbow's top surface 114 to this nozzle surface 138, the shape of the nozzle surface has been reconfigured from that shown in FIG. 4(*a*). The welding surface 140 now has the simpler shape of a ring compared that of the discontinuous surfaces used in the prior art; for comparison purposes, see FIG. 7(*b*) which depicts this comparable surface for the prior art housing shown in FIG. 4(*a*). In the present embodiment, the thickness of this welding surface has also been increased in order to make the task of welding these pieces easier.

Figure 8A:
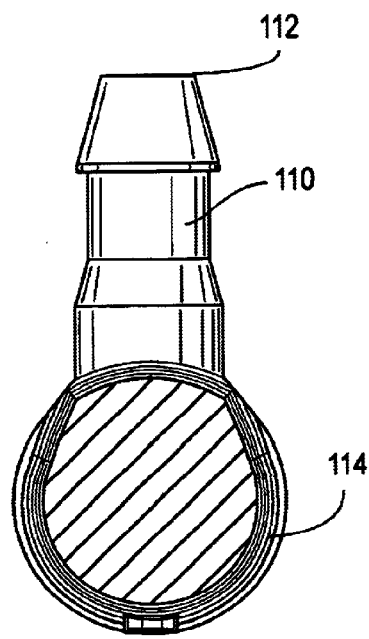
FIG. 8(a) is a cross-sectional view of top surface of the elbow shown in FIG. 5.
Figure 8B:
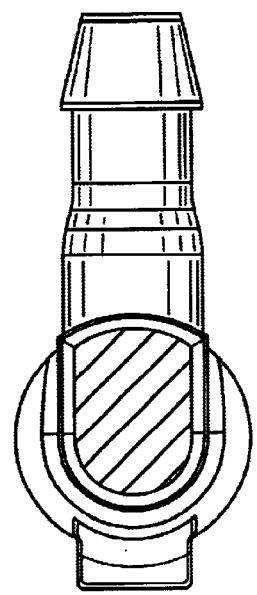
FIG. 8(b) is a cross-sectional view of top surface of the elbow shown in FIG. 4, and in which the contact surfaces of the present invention can compared with those attainable using the prior art technology shown in FIG. 4.

Additionally, as seen by comparing FIGS. 8(*a*) and 8(*b*), the top surface 114 of the elbow of the present invention, as shown in FIG. 8(*a*), has been made both flatter and larger in contact area than that of the prior art elbow shown in FIGS. 8(*b*) and 4(*a*). This allows for better transfer of welding energy and greatly reduces the difficulty of welding these parts.

The housing tool of the present invention is much simpler due to its simpler coring. Higher welding strength can be achieved in the parts of the present invention and the percentage of parts that have to be scrapped due to fabrication defects is greatly reduced.

An additional advantage of the present invention is that the elbow of the present invention may be welded in any orientation, thereby providing greater design and manufacturing flexibility.

As to a further discussion of the manner of usage and operation of the present invention, the same should be apparent from the above description. Accordingly, no further discussion relating to the manner of usage and operation will be provided.

However, it should be noted that the check valve 100 of the present invention, although it has been discussed only in the context of it being used in a windshield washer assembly, can be used in many other types of liquid flow application. For example, in any situation in which it is desired to have a fluid jet which intermittently exhausts into a gaseous surrounding environment, and in which it is desired to have this jet to flow on demand so as to quickly assume a steady state condition, a check valve constructed according to the teachings herein could be used to help regulate the flow of such a jet.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as hereinafter set forth in the claims.

We claim:

1. A check valve for use in a section of a liquid flow pipe to control the flow of a liquid through said pipe, wherein said section having inlet and outlet ends with each having an opening through which liquid respectively enters and exits said section, said check valve comprising:

a compression spring having upstream and downstream ends, wherein said spring configured so as to allow said downstream end to press against a portion of said section outlet end, a piston having bottom, top and outer side surfaces, said piston having a cavity that extends from said top surface and is configured to allow said spring to sit and be compressed longitudinally within said cavity with said spring upstream end resting on a portion of the bottom surface of said cavity, said piston having an opening in said side surface that connects said cavity and said outer side surface, said piston bottom surface having a sealing surface protecting outwardly therefrom with an outer boundary that is configured so as to allow said boundary to enclose said opening in said section inlet end, whereby when said piston bottom surface is pressed against said section inlet end by the action of said spring, said sealing surface seals the area around the opening of said inlet end so as to prevent liquid from flowing through said opening, wherein said piston being made from an elastomeric material so as to give said piston sealing surface the elastic properties necessary to allow said piston bottom surface to act as a seal for said inlet opening, and wherein said sealing surface is not a separate member that is inserted into said check valve.

2. A check valve as recited in claim 1, wherein the shape of said sealing surface is chosen from the group consisting of an O-ring shaped surface or a surface in the form of an outwardly directed rib having an end that angles upward and away from said piston bottom surface.

3. A check valve as recited in claim 1, wherein said flow pipe to receive said valve is the inlet flow passage of the housing for a windshield washer nozzle assembly.

4. A check valve as recited in claim 2, wherein said flow pipe to receive said valve is the inlet flow passage of the housing for a windshield washer nozzle assembly.

5. A method of making a check valve for use in a section of a liquid flow line to control the intermittent flow of a liquid through the line, wherein said section having inlet and outlet ends with each having an opening through which liquid respectively enters and exits said section, said method comprising the steps of:

acquiring a compression spring having upstream and downstream ends, wherein said spring configured so as to allow said downstream end to press against said section outlet end, acquiring a piston made from an elastomeric material and having bottom, top and outer side surfaces, said piston having a cavity that extends from said top surface and is configured to allow said spring to sit and operated freely within said cavity with said spring upstream end resting on the bottom surface of said cavity, said piston having an opening in said side surface that connects said cavity and said outer side surface, said piston bottom surface protecting outwardly therefrom having a sealing surface with an outer boundary that is configured so as to allow said boundary to enclose said opening in said section inlet end, placing said upstream end of said spring in said cavity of said piston, orienting said valve within said flow line so that the downstream end of said spring presses against said section outlet and compressing said spring so as to cause said piston bottom surface to press against said section inlet end so that said sealing surface seals the area around the opening of said inlet end so as to prevent liquid from flowing through said opening, and wherein said sealing surface is not a separate member that is inserted into said check valve.

6. A method as recited in claim 5, wherein said flow line to receive said valve is the inlet flow passage of the housing for a windshield washer nozzle assembly.

* * * * *